(12) United States Patent
Sorg et al.

(10) Patent No.: US 11,825,244 B2
(45) Date of Patent: Nov. 21, 2023

(54) PLANAR LIGHT CIRCUIT AND ARRANGEMENT WITH PLANAR LIGHT CIRCUIT

(71) Applicant: OSRAM Opto Semiconductors GmbH, Regensburg (DE)

(72) Inventors: Jörg Erich Sorg, Regensburg (DE); Hubert Halbritter, Dietfurt (DE); Ann Russell, San Jose, CA (US)

(73) Assignee: OSRAM OPTO SEMICONDUCTORS GMBH, Regensburg (DE)

(*) Notice: Subject to any disclaimer, the term of this patent is extended or adjusted under 35 U.S.C. 154(b) by 181 days.

(21) Appl. No.: 17/234,311

(22) Filed: Apr. 19, 2021

(65) Prior Publication Data

US 2022/0337794 A1 Oct. 20, 2022

(51) Int. Cl.
*H04N 9/31* (2006.01)
*G02B 27/01* (2006.01)

(52) U.S. Cl.
CPC ....... *H04N 9/3161* (2013.01); *G02B 27/0172* (2013.01); *H04N 9/3155* (2013.01); *H04N 9/3164* (2013.01); *G02B 2027/0178* (2013.01)

(58) Field of Classification Search
None
See application file for complete search history.

(56) References Cited

U.S. PATENT DOCUMENTS

| 5,802,222 A | 9/1998 | Rasch et al. |
| 2016/0248225 A1* | 8/2016 | Sayyah ................. H01S 5/0425 |
| 2018/0120559 A1 | 5/2018 | Yeoh et al. |
| 2022/0091444 A1 | 3/2022 | Behringer et al. |

OTHER PUBLICATIONS

Behringer et al., US Patent Appln entitled "Optoelectronic Module, Method for Operating an Optoelectronic Module and Head-Mounted Display", U.S. Appl. No. 17/028,539, filed Sep. 22, 2020.
A. Jacobs (EP Authorized Officer), International Search Report and Written Opinion in corresponding International Application No. PCT/EP2022/059939 dated Jul. 27, 2022, 17 pages.

* cited by examiner

*Primary Examiner* — Nicholas J Lee
(74) *Attorney, Agent, or Firm* — MH2 TECHNOLOGY LAW GROUP LLP

(57) ABSTRACT

A planar light circuit comprises a substrate and a first pixel. The first pixel comprises a first number N of laser diodes, a first waveguide located on the substrate, a first number N of inlets which couple the first number N of laser diodes to the first waveguide and a first outlet. The first waveguide couples the first number N of inlets to the first outlet.
An arrangement comprises the planar light circuit. The arrangement is realized as data glasses.

16 Claims, 11 Drawing Sheets

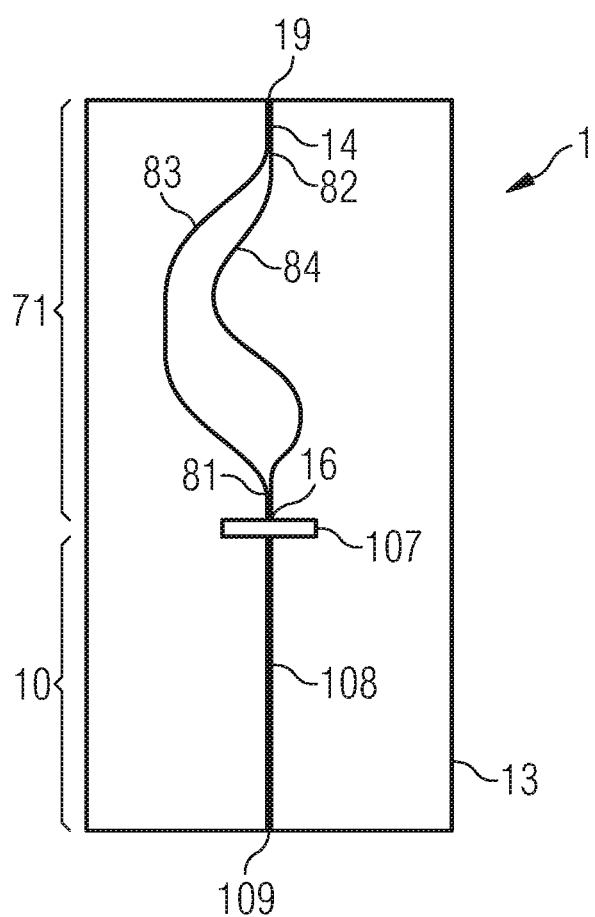

PLANAR LIGHT CIRCUIT AND ARRANGEMENT WITH PLANAR LIGHT CIRCUIT

FIELD

A planar light circuit and an arrangement with planar light circuit is provided.

BACKGROUND

A planar light circuit often includes a substrate, a waveguide located on top of the substrate, an inlet and an outlet. For example, a laser is used as a light source. A laser emits coherent light in which a wave front is in phase and which has a narrow spectral width. The planar light circuit, abbreviated PLC, is used for beam shaping and beam combining and does not change the coherence of the light sources to a first approximation. In an optical architecture of a projection unit, optics with periodic structures are used, such as holographic mirrors or diffractive two-dimensional waveguides. Diffraction effects occur at periodic optical elements in the beam path, for example due to constructive and destructive interference. These effects are visible in the generated images as optical artefacts such as speckles. An arrangement designed for augmented reality or virtual reality, for example data glasses, require that artefacts are highly reduced. A planar light circuit can be implemented as photonic chip.

SUMMARY

It is an object to provide a planar light circuit and an arrangement with a planar light circuit with reduction of optical artefacts.

According to an embodiment, a planar light circuit comprises a substrate and a first pixel. The first pixel comprises a first number N of laser diodes, a first waveguide located on or at the substrate, a first number N of inlets which couple the first number N of laser diodes to the first waveguide and a first outlet. The first waveguide couples the first number N of inlets to the first outlet.

Advantageously, the first number N of laser diodes are directly connected to the first waveguide via the first number N of inlets. The first waveguide is configured to guide the electromagnetic radiation received at the first number N of inlets to the first outlet. Thus, at least a high mechanical stability of the planar light circuit is achieved.

In an example, the first number N is 1, 2, 3 or 4. Alternatively, the first number N is at least 1, at least 2, at least 3 or at least 4. The electromagnetic radiation guided by the first waveguide is light. The electromagnetic radiation includes e.g. at least one of visible light, infrared light and ultraviolet light.

According to at least one embodiment of the planar light circuit, the first waveguide comprises a Mach-Zehnder modulator. The Mach-Zehnder modulator comprises a beam splitter, a beam combiner, a first waveguide path coupling the beam splitter to the beam combiner and a second waveguide path coupling the beam splitter to the beam combiner. The first waveguide path and the second waveguide path are configured to have different light propagation properties. The first waveguide path and the second waveguide path are configured to generate at least one of a phase shift and an intensity reduction of electromagnetic radiation provided to the beam splitter. The beam splitter is connected to a first part of the first waveguide and the beam combiner is connected to a second part of the first waveguide.

According to at least one embodiment of the planar light circuit, a path length of the first waveguide path is different from a path length of the second waveguide path. The two waveguide paths have a different light propagation.

According to at least one embodiment of the planar light circuit, at least one of the first and the second waveguide path comprises a number P of sections. A section of the number P of sections comprises at least one of air, a material with low refractive index and a modified material of the first waveguide. For example, the section is realized as a groove. The groove is partially filled the material with low refractive index; the non-filled part of the groove is filled e.g. with air. Alternatively, the groove is completely filled with the material with low refractive index or with air. Alternatively, the section comprises the modified material of the first waveguide which is modified by a doping process (e.g. including a diffusion process).

According to at least one embodiment of the planar light circuit, a section of the number P of sections is realized as a groove which has two facets which are coated by an antireflective coating, abbreviated antireflex coating. Alternatively, the facets are uncoated.

According to at least one embodiment of the planar light circuit, at least one of the first waveguide path and the second waveguide path comprises a section filled with an electro-optical material. The section is partially filled or completely filled the electro-optical material. The Mach-Zehnder modulator includes an electrode coupled to the electro-optical material. The electro-optical material is e.g. out of group comprising $LiNb_3$, $MoSe_2$, $MoTe_2$, $MoS_2$ and $WS_2$.

Advantageously, the Mach-Zehnder modulator is configured to be controlled by an electrical signal provided by the electrode. The electrical signal is e.g. a voltage which generates an electric field at the electro-optical material. Thus, a change of optical properties of the electro-optical material (e.g. change of refractive index) as a function of the electric field is achieved. The Mach-Zehnder modulator uses e.g. a linear electro-optic effect, also named Pockels effect, or a quadratic electro-optic effect, named Kerr effect.

According to at least one embodiment of the planar light circuit, a laser diode of the first number N of laser diodes includes a front facet, a laser ridge and a backside mirror. The front facet, the laser ridge and the backside mirror are realized at or on the substrate. The front facet is coupled to an inlet of the first number N of inlets. The first number N of laser diodes are monolithically integrated in the planar light chip. Thus, the laser diode is realized as edge emitting laser, abbreviated EEL.

According to at least one embodiment of the planar light circuit, an inlet of the first number N of inlets includes at least one of a prism, a grating and an encapsulation. Thus, a laser diode of the first number N of laser diodes is set e.g. on top of the inlet. For example, the first number N of laser diodes are realized as at least one of vertical-cavity surface-emitting lasers, abbreviated VCSELs, and edge emitting lasers, abbreviated EELs. Advantageously, the VCSELs and EELs are attached to the first waveguide with high stability by the inlets.

According to at least one embodiment of the planar light circuit, the first outlet is configured for top emission of light. In an example, the first outlet includes at least one of a prism and a grating.

According to at least one embodiment, the planar light circuit includes a photodiode coupled to the waveguide. Advantageously, intensity of electromagnetic radiation inside the waveguide can be measured and thus controlled.

According to at least one embodiment, the planar light circuit comprises a second pixel. The second pixel comprises a second number N2 of laser diodes, a second waveguide located on the substrate, a second number N2 of inlets which couple the second number N2 of laser diodes to the second waveguide and a second outlet. The second waveguide is configured to guide the light of the second number N2 of inlets to the second outlet. The second pixel is implemented such as the first pixel. The second outlet is adjacent to the first outlet. A distance of the first outlet to the second outlet is in a range between 1 µm and 60 µm, alternatively between 2 µm and 50 or alternatively between 2 µm and 5 µm µm. The distance is determined between a center of the first outlet and a center of the second outlet.

In an example, the first pixel and the second pixel overlap to build one pixel. In other words, the first pixel and the second pixel are configured to realize a common pixel in an image plane after optical projection.

According to at least one embodiment of the planar light circuit, the first number N is at least 3 and the second number N2 is at least 3.

According to at least one embodiment of the planar light circuit, the first number N of laser diodes and the second number N2 of laser diodes are realized as one of VCSELs and EELs.

According to at least one embodiment of the planar light circuit, the first number N of laser diodes include a red VCSEL, a green VCSEL and a blue VCSEL. The second number N2 of laser diodes include a red VCSEL, a green VCSEL and a blue VCSEL.

According to at least one embodiment of the planar light circuit, the first number N of laser diodes include a red EEL, a green EEL and a blue EEL. The second number N2 of laser diodes include a red EEL, a green EEL and a blue EEL.

According to at least one embodiment of the planar light circuit, the first number N is at least 4 and the first number N of laser diodes further comprise an IR laser diode, such as e.g. an IR VCSEL or IR EEL. Similarly, the second number N2 is at least 4 and the second number N2 of laser diodes further comprise an IR laser diode, such as e.g. an IR VCSEL or IR EEL. For example, the IR laser diode is configured for eye tracking (e.g. pupil tracking) in a laser beam scanning system, abbreviated LBS system, with retina scan system architecture.

According to at least one embodiment of the planar light circuit, the first waveguide includes a first combiner coupled on its input side to the first number of inlets and on its output side to the first outlet. The first combiner is configured as e.g. a waveguide and wavelengths combiner. The first combiner comprises e.g. an arrayed waveguide grating.

According to at least one embodiment of the planar light circuit, a first laser diode of the first number N of laser diodes is configured to emit electromagnetic radiation at a first wavelength. A further first laser diode of the second number N2 of laser diodes is configured to emit electromagnetic radiation at a further first wavelength. A first difference of the first wavelength and of the further first wavelength is in a range between 3 nm and 15 nm, alternatively between 4 nm to 11 nm. The further first laser diode has a shifted emission of light corresponding to the first laser diode.

Advantageously, the first laser diode and the further first laser diode emit electromagnetic radiation in the same wavelengths region but do not have exactly the same wavelength. Thus, since the first and further first laser diodes together have a broader wavelengths distribution as a single laser diode, speckle effects are reduced.

According to at least one embodiment of the planar light circuit, at least one of the first waveguide and the second waveguide includes a Mach-Zehnder modulator. The Mach-Zehnder modulator can be realized as described above.

According to at least one embodiment, the planar light circuit comprises a number L of pixels which include the first and the second pixel. The number L is at least three or at least four. Outlets of the number L of pixels are arranged in an array form. The number L is e.g. an even number; the array comprises e.g. two rows each having a number L/2 outlets. The pixels of the number L of pixels are implemented such as the first and the second pixel.

According to at least one embodiment, an arrangement comprises the planar light circuit. The arrangement is realized as one of a head-up display, laser beam scanning system, near-to-eye display projector, data glasses, smart glasses, augmented reality glasses and virtual reality glasses.

The optical light circuit is particularly suitable for the arrangement described above. Features described in connection with the optical light circuit can therefore be used for the arrangement and vice versa.

According to at least one embodiment, the arrangement includes the planar light circuit and at least a further planar light circuit. The planar light circuit and the at least a further planar light circuit form e.g. a stack or are arranged laterally on a surface of a carrier. The outlets of the planar light circuit and the at least a further planar light circuit are on one side of the stack.

According to an embodiment, a planar light circuit comprises a substrate and a first pixel. The first pixel comprises a first number N of laser diodes, a first waveguide located on the substrate, a first number N of inlets which couple the first number N of laser diodes to the first waveguide and a first outlet. The first waveguide couples the first number N of inlets to the first outlet. The first waveguide comprises an electrically controlled Mach-Zehnder modulator. A laser diode of the first number N of laser diodes comprises a front facet, a laser ridge and a backside mirror. The front facet is connected to an inlet of the first number N of inlets. The first waveguide, the laser diode of the first number N of laser diodes and the Mach-Zehnder modulator are monolithically integrated on the substrate.

Advantageously, the planar light circuit can be realized in a compact manner. Advantageously, the electrically controlled Mach-Zehnder modulator is configured to modulate the electromagnetic radiation emitted by the laser diode, thus reducing optical artefacts such as speckle. The planar light circuit can be implemented as described in the paragraphs above and below.

In an example, the planar light circuit realizes a RGB low power VCSEL illumination with different wavelengths for augmented reality (abbreviated AR)/near-to-eye. VCSELs transmit e.g. a single-mode or multi-mode beam which is appropriate for laser beam scanning near-to-eye projection. Combining red, green, blue, and IR VCSELSs in a single package enable connectivity and unification of the various lasers colors to achieve improved system performance. The planar light circuit uses RGB VCSELs coupled into waveguides with one RGB outcoupling pixel. These pixels are scaled to create M times N outcoupling RGB pixels. A sidelooker packaging uses the planar light circuit. An illumination is optionally monitored by a photodiode. A Mach-Zehnder structure is e.g. integrated in the waveguide. Increased scanning performance of augmented reality laser beam scanning is performed by using M time N pixels. A wavelength offset of RR-GG-BB VCSELs (red-red, green-green, blue-blue VCSELs) results in reduction of elimination of coherence artifacts such as speckle. Dimming control is achieved by using a Mach-Zehnder interference structure. An incorporation of a photodiode for additional feedback of white balance is performed during aging and temperature changes of operation.

Advantageously, the planar light circuit can be fabricated cost-effective. Only a low power is required to better serve a micro-projector near-to-eye display. Unification in pixels corresponding to wavelength offset pixels eliminates coherence artifacts. Mach-Zehnder modulator and photo diode monitoring offers illumination monitoring simultaneously for each pixel, thereby reducing system cost and complexity. The planar light circuit is configured for near-to-eye projection for augmented reality. The planar light circuit is e.g. a part of augmented reality glasses for enterprise, consumer and prosumer applications. Low-power VCSELs which are combined using a planar light circuit have e.g. a wavelength difference which can eliminate speckle. A multi ridge die can increase scan speed inherently, thus reducing system flicker. Improved scanner performance is achieved.

In an example, the planar light circuit and/or the arrangement are configured for a RGB-low power VCSEL micro imager with different wavelengths as light engine for augmented reality.

In an example, the planar light circuit achieves a suppression of optical artifacts generated by the interaction in between coherent light sources such as a laser and optical elements e.g. with periodic structures. For example a coherence suppression is achieved by a wave front shift or a wave front shift element. The planar light circuit reduces the level of optical artefacts generated in light engines for projection systems, especially augmented reality glasses. The optical artefacts are generated by the interaction of a coherent light source with periodic structures in diffractive waveguides. This is a serious topic for data glasses with flying laser spot system architecture. The planar light circuit is e.g. implemented for laser beam scanning, abbreviated LBS.

In an example, the planar light circuit is intended to be used for data glasses (AR/VR). For this kind of product, the overall size of the product is an essential topic (key performance indicator). One way to realize compact systems is the so called "Flying Spot Laser Beam" approach. The image in this case is realized by a laser beam or a plurality of laser beams which are deflected by a micro-electro-mechanical-system mirror, abbreviated MEMS mirror. On its way to the human eye the image is guided by an optical element. In general, this kind of optical elements can be realized by two different physical effects. One is diffraction, the other one is refraction. In diffractive optical element the guiding of the light is realized by diffraction of the light on periodical structures with a geometric size in the area of the wavelength itself. This works properly as long as the light has certain spectral width. Requested are >5 nm-10 nm for the visible wavelengths. If the spectral band width is lower than that and the light source is coherent, which means that all emitted light has the same frequency, this leads to interference effects. By constructive and destructive interference there are areas in the image where the intensity goes down to almost zero. This interference effects cause optical artifacts in the generated images.

In an example, the planar light circuit and the arrangement with the planar light circuit are applied for augmented reality and virtual reality glasses with laser beam scanning technology, for head-up display systems for automotive and aerospace industry applications, laser projection engines and for visualization by laser beam scanning systems (abbreviated LBS systems). The planar light circuit results in improved image quality, miniaturization and cost reduction as the planar light circuit is much simpler than other devices. The planar light circuit can be configured for laser projection, visualization, performing coherence suppression and optical artefact reduction. The planar light circuit provides e.g. a wave front shift.

BRIEF DESCRIPTION OF THE DRAWINGS

The following description of figures of examples or embodiments may further illustrate and explain aspects of the planar light circuit and the arrangement. Arrangements, layers, structures and devices with the same structure and the same effect, respectively, appear with equivalent reference symbols. In so far as arrangements, layers, structures and devices correspond to one another in terms of their function in different figures, the description thereof is not repeated for each of the following figures.

FIGS. 5A to 5E show exemplary embodiments of a planar light circuit with a Mach-Zehnder modulator.

DETAILED DESCRIPTION

Figure 1:
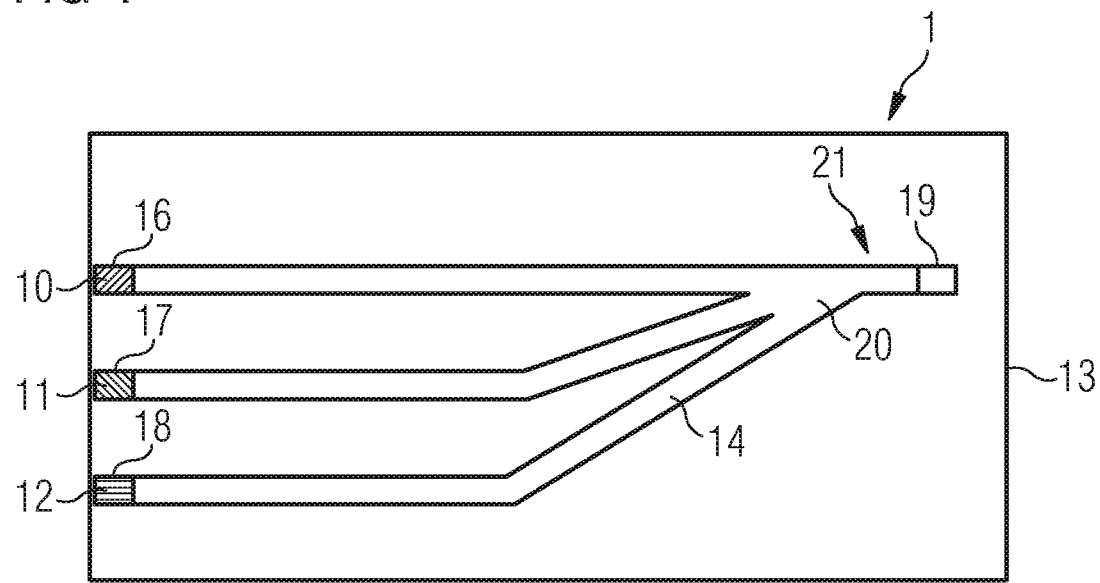
FIG. 1 shows an exemplary embodiment of a planar light circuit.

FIG. 1 shows an exemplary embodiment of a planar light circuit 1 that comprises a first number N of laser diodes 10 to 12. The first number N of laser diodes 10 to 12 are realized e.g. as vertical-cavity surface-emitting lasers, abbreviated to VCSEL. In this example, the first number N is 3. The first number N is alternatively 1, 2, 4 or more than 4. The first number N of laser diodes 10 to 12 emits light at different wavelengths. Thus, the first laser diode 10 is implemented as a blue VCSEL, the second laser diode 11 is realized as a red VCSEL and the third laser diode 12 is implemented as a green VCSEL. The planar light circuit 1, abbreviated to circuit 1, can also be named photonic chip or planar light circuit chip.

Moreover, the planar light circuit 1 comprises a substrate 13 and a waveguide 14 which is located at or on the substrate 13. The waveguide 14 may be named light guide. The planar light circuit 1 includes a first number N of inlets 16 to 18 which couple the first number N of laser diodes 10 to 12 to the waveguide 14. The first number N of inlets 16 to 18 couples the first number N of laser diodes 10 to 12, e.g. via at least one of a prism, grating and encapsulant, to the waveguide 14. The material of the encapsulant is designed e.g. to be transparent to the emitted wavelength and to be not destroyed by the emitted wavelength within the lifetime. This applies at least in the case that the material is in the beam path. The material is selected from a group comprising silicone, siloxane and silazane. The planar light circuit 1 comprises an outlet 19. The waveguide 14 optically couples the first number N of inlets 16 to 18 to the outlet 19. The waveguide 14 comprises a first combiner 20 that combines a first number N of paths of the waveguide 14 originating at the first number of inlets 16 to 18 to a path leading to the outlet 19. The first combiner 20 can be implemented as a waveguide and wavelength combiner. The first combiner 20 is realized, for example, as an arrayed waveguide grating, abbreviated to AWG.

The substrate 13 is made e.g. of a semiconductor material such as silicon, germanium, gallium nitride or gallium arsenide or an insulator material such as silica ($SiO_2$) or glass. The waveguide 14 is realized, for example, by silicon nitride or silicon dioxide on top of the substrate 13. The outlet 19 is configured for top emission. An electro-magnetic radiation leaves the planar light circuit 1 perpendicular to a surface of the planar light circuit 1. The outlet 19 includes, for example, a prism and a grating.

In the example, the planar light circuit 1 includes one pixel which is named first pixel 21. The first pixel 21 is realized at least by the first number N of laser diodes 10 to 12, the first number N of inlets 16 to 18, the substrate 13, the waveguide 14 and the outlet 19. The circuit 1 is configured for red, green, blue emission, abbreviated to RGB emission.

In FIG. 1, a top view of the planar light circuit 1 is described. The three laser diodes 10 to 12, implemented as blue laser, red laser and green laser, are mounted on the waveguide 14 via at least a prism, a grating and a silicon adhesive/encapsulant etc. The three lasers 10 to 12 are combined in the planar light circuit 1 via some change in the index of refraction of the waveguide 13 with respect to the substrate 13. The laser diodes 10 to 12 will become a unified spot, realized by the outlet 19. R-G-B VCSELs coupled into the waveguide 14 with one outlet 19, named RGB outcoupling pixel, are used. The first pixel 21 is a RGB pixel.

In an alternative, not shown embodiment, the planar light circuit 1 comprises a fourth laser diode. The fourth laser diode is realized e.g. as an infrared VCSEL. Thus, the first number N is 4. At the outlet 19, red, green, blue and infrared radiation is emitted.

In an alternative, not shown embodiment, the planar light circuit 1 comprises a further laser diode. The further laser diode is realized e.g. as a further green VCSEL. Thus, the first number N is 4. At the outlet 19, red, green and blue is emitted. The first pixel 21 is a RGGB pixel.

Alternatively, the planar light circuit 1 comprises the further laser diode being a green laser diode and the fourth laser diode being an IR laser diode.

Figure 2A:
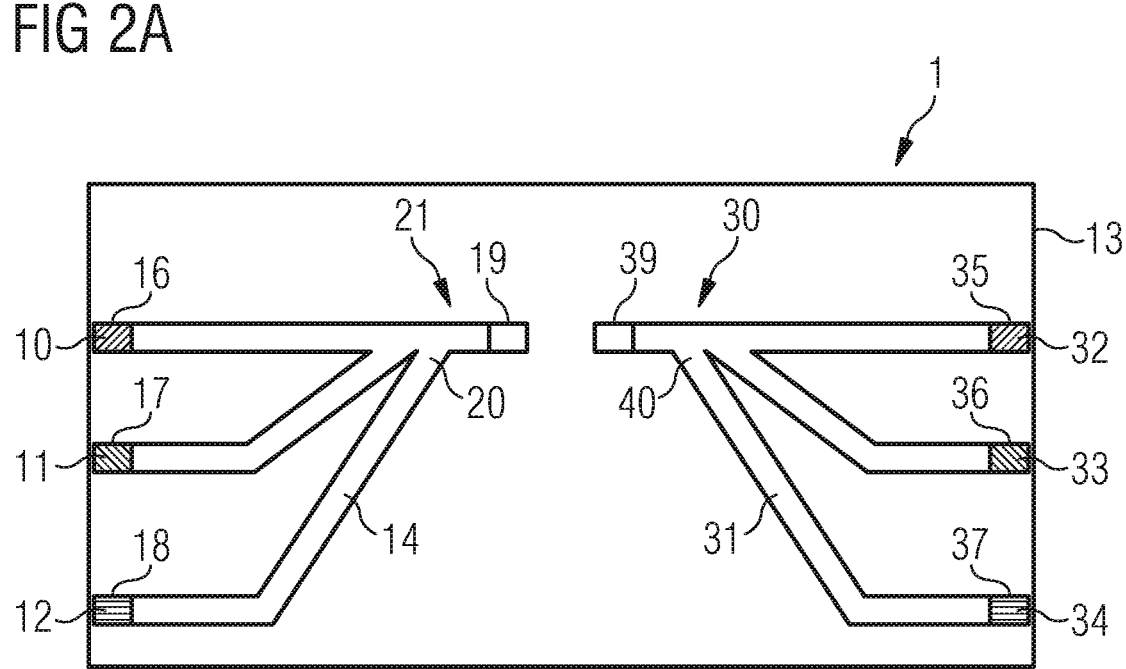
FIGS. 2A to 2C show exemplary embodiments of a planar light circuit with two pixels.

Alternatively, the first number N of laser diodes 10 to 12 are configured as edge emitting lasers, abbreviated EELs. FIG. 2A shows an exemplary embodiment of a planar light circuit 1 which is a further development of the embodiment shown in FIG. 1. The planar light circuit 1 comprises a number L of pixels. In FIG. 2A, the number L is two (in FIG. 1, the number L is one). Thus, the number L of pixels include the first pixel 21 and a second pixel 30. The second pixel 30 is implemented such as the first pixel 21. Thus, the second pixel 30 includes a second number N2 of laser diodes 32 to 34, a second number N2 of inlets 35 to 37, a second waveguide 31 and a second outlet 39. The second number N2 is e.g. equal to the first number N. The second number N2 of laser diodes 32 to 34 of the second pixel 30 are realized as blue VCSEL, red VCSEL and green VCSEL. The second outlet 39 of the second pixel 30 is adjacent to the first outlet 19 of the first pixel 21. The number L of pixels 21, 30 are realized on the substrate 13. The substrate 13 is a common substrate for the number L of pixels 21, 30. The second waveguide 31 of the second pixel 30 includes a second combiner 40.

The first laser diode 10 of the first number N of laser diodes 10 to 12 is configured to emit electromagnetic radiation at a first wavelength (e.g. in the blue region). A further first laser diode 32 of the second number N2 of laser diodes 32 to 34 is configured to emit electromagnetic radiation at a further first wavelength. A first difference of the first wavelength and of the further first wavelength is in a range between 3 nm and 15 nm, alternatively between 4 nm to 11 nm.

Similarly, the second laser diode 11 of the first number N of laser diodes 10 to 12 is configured to emit electromagnetic radiation at a second wavelength (e.g. in the red region). A further second laser diode 33 of the second number N2 of laser diodes 32 to 34 is configured to emit electromagnetic radiation at a further second wavelength. A second difference of the second wavelength and of the further second wavelength is in a range between 3 nm and 15 nm, alternatively between 4 nm to 11 nm.

Correspondingly, the third laser diode 11 of the first number N of laser diodes 10 to 12 is configured to emit electromagnetic radiation at a third wavelength (e.g. in the green region). A further third laser diode 33 of the second number N2 of laser diodes 32 to 34 is configured to emit electromagnetic radiation at a further third wavelength. A third difference of the third wavelength and of the further third wavelength is in a range between 3 nm and 15 nm, alternatively between 4 nm to 11 nm. The first, second and third difference may have equal or different values.

In FIG. 2A, the top view of the planar light circuit 1 previously shown in FIG. 1 is described. The circuit 1 incorporates laser diodes 32 to 34 of the same color but having offsets by e.g. 10 nm in wavelength. This offset in wavelength will reduce disturbances. The offset does not need to be the same for the blue VCSELs and the green VCSELs however, as the coherence length observed in blue and green VCSELs is significantly less than in case of the red VCSELs. An offset of 5-7 nm for green and blue VCSELs is e.g. also appropriate. This offset in wavelength of VCSELs will eliminate speckle caused by coherence effects. If the first pixel 21 and the second pixel 30 overlap (e.g. via a scanning MEMS mirror) for illuminating the same pixel (e.g. in an image plane) and each pixel 21, 30 has different wavelengths with a difference e.g. DI~10 nm, then typical interference, speckle and further problems are reduced.

Figure 2B:
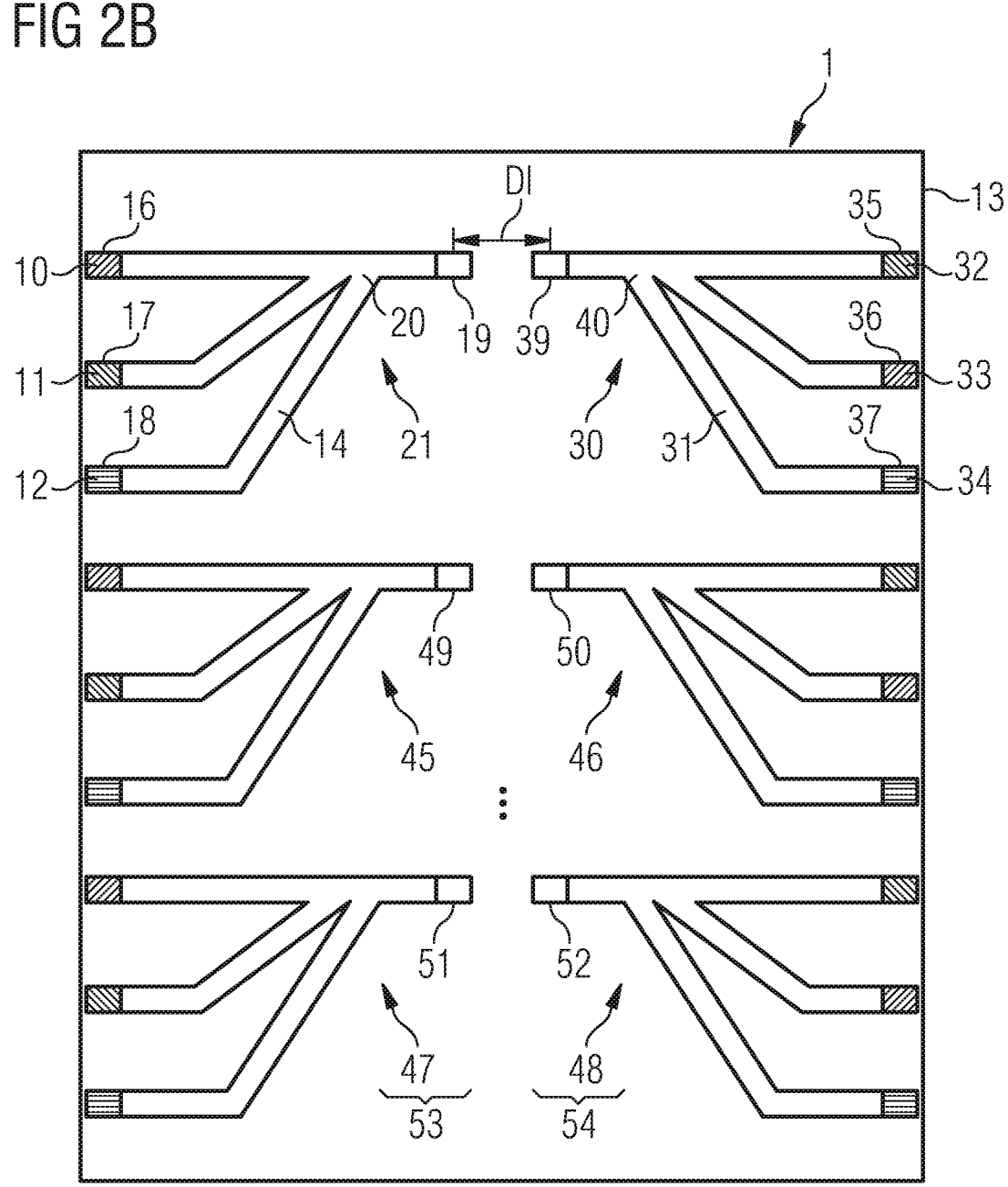

FIG. 2B shows an exemplary embodiment of a planar light circuit 1 which is a further development of the embodiments shown above. In the example shown in FIG. 2B, the number L of pixels 21, 30, 45 to 48 is 6. Thus, the circuit 1 comprises a third to a sixth pixel 45 to 48. The number L of pixels 21, 30, 45 to 48 are designed such as the first pixel 21. The number L of pixels 21, 30, 45 to 48 are arranged in groups of two. The pixels of a group have outlets which are adjacent to each other. A distance DI between the two adjacent outlets is equal or less than 60 µm, alternatively equal or less than 50 µm or equal or less than 5 µm. The distance DI is determined between a center of an outlet 19, 49, 51 and a center of an adjacent outlet 39, 50, 52. Thus, the first and the second pixel 1, 30 have adjacent outlets 19, 39 with the distance DI. Correspondingly, the third and the fourth pixel 45, 46 have adjacent outlets 49, 50 with the distance DI. Additionally, the fifth and the sixth pixel 47, 48 have adjacent outlets 51, 52 with the distance DI. The other parts of the third to the sixth pixel 45 to 48 are realized such as the parts of the first and the second pixel 21, 30.

Thus, the planar light circuit 1 realizes a row of n×m pixel which are e.g. used for scanning via a MEMS mirror. In an example, m=2 and n=L/2.

In other words, the circuit 1 comprises a first row 53 of a number L/2 pixels 21, 45, 47 and a second row 54 of the number L/2 pixels 30, 46, 48. The first row 53 and the second row 54 are parallel to each other and adjacent to each other. The laser diodes of the first row 53 and the laser diodes of the second row 54 have a difference in wavelengths as described above.

In FIG. 2B, multiple rows of blue, green and red VCSELs are shown which reduce the scan speed required for the mirror or mirrors into which they will be coupled. The mechanical offset in-between the emission pixel can be corrected by laser mirror synchronization. Thus, speckle effects are suppressed or eliminated by combination or overlap of laser diodes with slight wavelength offset in a range up to 10 nm to artificially widen the spectral emission bandwidth.

Figure 2C:
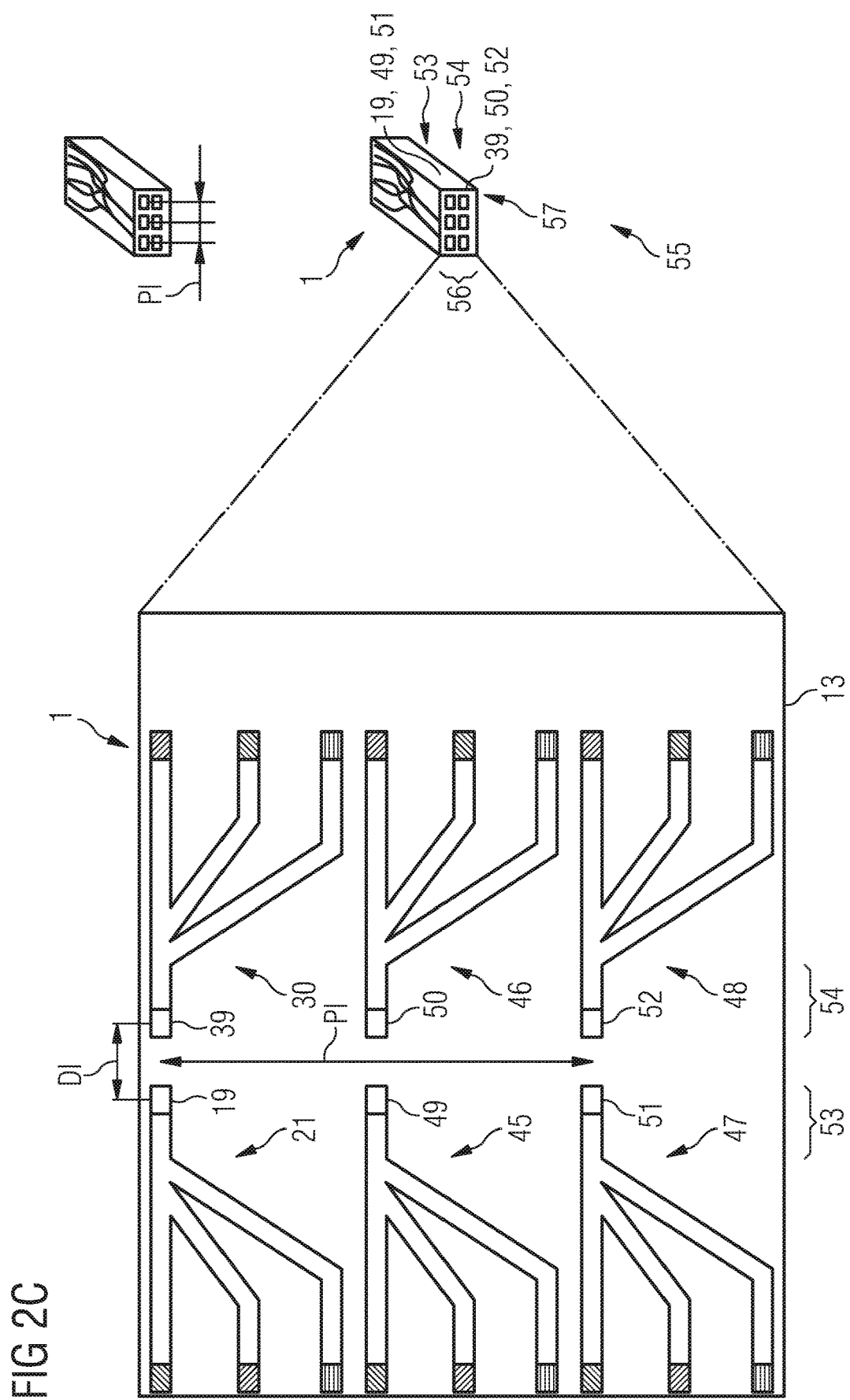

FIG. 2C shows an exemplary embodiment of a planar light circuit 1 which is a further development of the embodiments shown in FIGS. 1, 2A and 2B. As shown in FIGS. 2A and 2B and on the left side of FIG. 2C, the planar light circuit 1 is realized on a common substrate 13. The number L of pixels 21, 30, 45 to 48 are located on a planar substrate or carrier. As indicated on the right side of FIG. 2C, an arrangement 55 comprises a stack 56. The stack 56 comprises the planar light circuit 1 as discussed above and a further planar light circuit 57 attached to the planar light circuit 1 in a stack configuration. The planar light circuit 1 comprises the first, third and fifth pixel 1, 45, 47 having the outlets 19, 49, 51. The further planar light circuit 57 comprises the second, fourth and sixth pixel 30, 46, 48 having the outlets 39, 50, 52. In an example, the outlets 19, 39, 49 to 52 are implemented as side outlets. The outlets 19, 39, 49 to 52 are configured for an emission at the side of the stack 56. Thus, the outlets 19, 39, 49 to 52 are not designed for top emission. The circuit 1 forms the first row 53 of outlets 19, 49, 51. The further planar circuit 57 forms the second row 54 of outlets 39, 50, 52.

In the right side of FIG. 2C, a multi-die is incorporated into a side looker package. In other words, at least two planar light circuits 1, 57 are incorporated into a side looker package. A pitch PI of the pixels 21, 30, 45 to 48 is selected such that they are able to be incorporated in the aperture of the scanning mirror directly, ideally without secondary optics. The pitch PI is a distance of the first outlet 19 of the first row 53 to the last outlet 51 of the first row 53. The pitch PI is e.g. in a range between 3 μm and 1000 μm, alternatively between 4 μm and 500 μm or between 4 μm and 12 μm. The pitch PI may also have other values. The pitch PI is determined between a center the first outlet 19 of the first row 53 and a center of the last outlet 51 of the first row 53. The pitch PI can be defined for the planar light circuit 1 shown on the left side of FIG. 2C and for the stack 56 shown on the right side of FIG. 2C.

R-G-B VCSELs are coupled into a waveguide with one outlet that can be named RGB outcoupling pixel, as shown in FIG. 1. These outlets or pixels are scaled to create M×N outlets (that is outcoupling RGB pixels), as shown in FIGS. 2A to 2C. If scanning takes place at least two of these pixel overlap to build one real pixel, e.g. in the image plane. These at least two pixels operate at slightly different wavelength for R,G,B to avoid interference patterns and/or speckle.

The stack 56 of planar light circuits 1, 57 realizes a row of n×m pixels which are used for scanning via a MEMS mirror. In an example, m=2. Advantageously, a distance between two outlets is low. Thus, the n×m outlets 19, 39, 49 to 52 can be projected in one position of the MEMS scanner into the image plane. Since pairs of outlets form a common pixel in the image plane, the n×m outlets result in n pixels in the image plane. The outlets 19, 39, 49 to 52 are arranged in an array form.

The planar light circuit 1 and/or the arrangement 55 has one or several of the following advantages in comparison to other solutions: VCSEL chips are much smaller than other laser diodes and thus result in a cost effective arrangement 55. Many VCSELs or micro VCSEL can be arranged in rows and/or columns. Each VCSEL has a fast modulation capability and only requires a low current (makes the VCSEL faster). The MEMS scanner can be realized as one-dimensional MEMS scanner; thus, there is enough time to perform very high speed modulation (ultra-short) pulses for VCSEL and to achieve a high dynamic range (wide dimming range). An overlap of e.g. more than one VCSEL pixels with slightly different wavelengths (e.g. spacing of wavelengths is 10 nm) reduces interference/speckle problems etc. A capability of a mass-transfer of μVCSEL, like μLED to mount on the planar light circuit chip is an option. Ultimately e.g. two VCSELs can address one image line; each VCSEL requires only μW. The array of outlets can expand from N times 2 to N times M. The MEMS mirror or scanner is e.g. a 1D scanner or a 2D scanner.

Figure 3A:
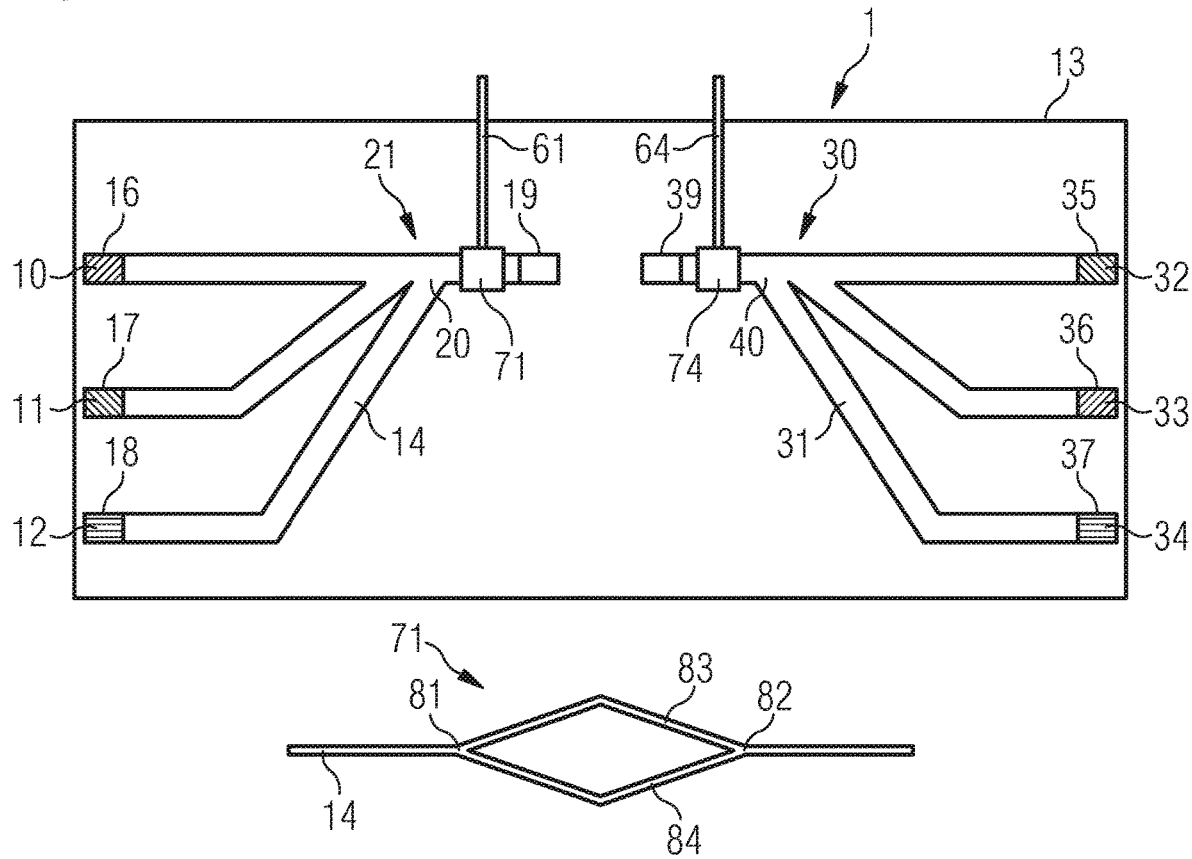
FIGS. 3A and 3B show exemplary embodiments of a planar light circuit with a Mach-Zehnder modulator.

FIG. 3A shows an exemplary embodiment of a planar light circuit 1 which is a further development of the embodiments shown above. The planar light circuit 1 comprises a modulator. The modulator can be implemented as a Mach-Zehnder modulator 71, also named first Mach-Zehnder modulator. The first Mach-Zehnder modulator 71 is arranged on the waveguide 14 between the first combiner 20 and the outlet 19. The pixel 21 includes exactly one Mach-Zehnder modulator 71. Correspondingly, the second pixel 30 also includes a further first Mach-Zehnder modulator 74. The further first Mach-Zehnder modulator 74 is arranged between the second combiner 40 and the second outlet 39 of the second pixel 30.

The first and the further first Mach-Zehnder modulator 71, 74 each have an electrode 61, 64. Signal lines of the arrangement 55 are connected to the electrodes 61, 64 of the first and the further first Mach-Zehnder modulator 71, 74. Thus, the first and the further first Mach-Zehnder modulator 71, 74 are electrically controlled. Phase differences and intensity reductions generated by the first and the further first Mach-Zehnder modulator 71, 74 are electrically controlled. The first and the further first Mach-Zehnder modulator 71, 74 are configured to provide an additional dimming. An example of one of the Mach-Zehnder modulators 71, 74 is shown in the lower part of FIG. 3A. The Mach-Zehnder modulator 71 comprises a beam splitter 81, a beam combiner 82 and a first and a second waveguide path 83, 84. The phase difference and intensity reduction are generated by the Mach-Zehnder modulator 71 due to a difference of the light propagation properties of the first waveguide path 83 and of the light propagation properties of the second waveguide path 84.

In an example, the first number N of laser diodes 10 to 12 are operated sequentially. In this case the colors are provided sequentially and one Mach-Zehnder modulator 71 is sufficient for modulating each of the colors provided by the first number N of laser diodes 10 to 12. If the colors are operated sequentially in a pixel, one Mach-Zehnder modulator per each pixel is sufficient.

Advantageously, the planar light circuit 1 obtains an additional dimming due to the Mach-Zehnder modulators 71, 74. The Mach-Zehnder modulator or Mach-Zehnder modulators 71, 74 include a nonlinear refractive index material, e.g. lithium niobate $LiNbO_3$, $MoSe_2$, $MoTe_2$, MoS$_2$ and/or WS$_2$. By using single mode VCSELs there is an option to additionally include Mach-Zehnder modulators on the chip of the planar light circuit 1 to achieve additional high dynamic range dimming (e.g. 20-30 dB).

Figure 3B:
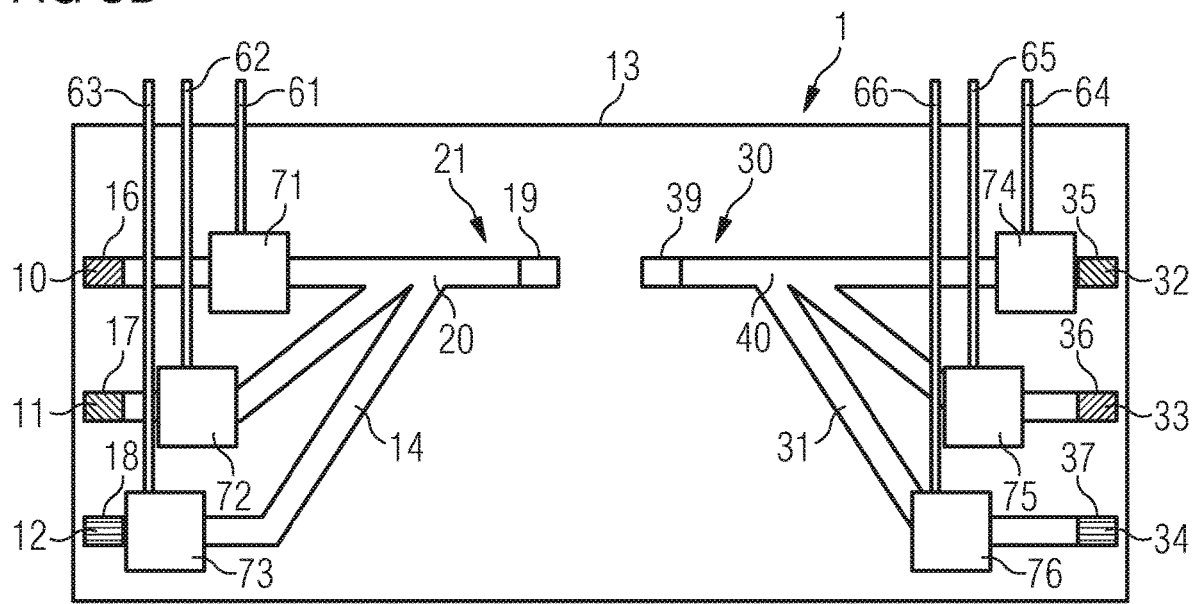

FIG. 3B shows an exemplary embodiment of a planar light circuit 1 which is a further development of the embodiments shown above. The planar light circuit 1 comprises a first number N of Mach-Zehnder modulators 71 to 73. The first number N of Mach-Zehnder modulators 71 to 73 are arranged on the waveguide 14 between the first number N of inlets 16 to 18 and the first combiner 20. Correspondingly, the second pixel also comprises a second number N2 of Mach-Zehnder modulators 74 to 76. The Mach-Zehnder modulators 71 to 76 include electrodes 61 to 66. Signal lines of the arrangement 55 are connected to the electrodes 61 to 66 of the Mach-Zehnder modulators 71 to 76. Thus, the first number N and the second number N2 of Mach-Zehnder modulators 71 to 76 are electrically controlled. Phase differences or intensity reductions generated by the first number N and the second number N2 of Mach-Zehnder modulators 71 to 76 are electrically controlled. The Mach-Zehnder modulators 71 to 76 are configured to provide a dimming or an additional dimming.

Figure 4A:
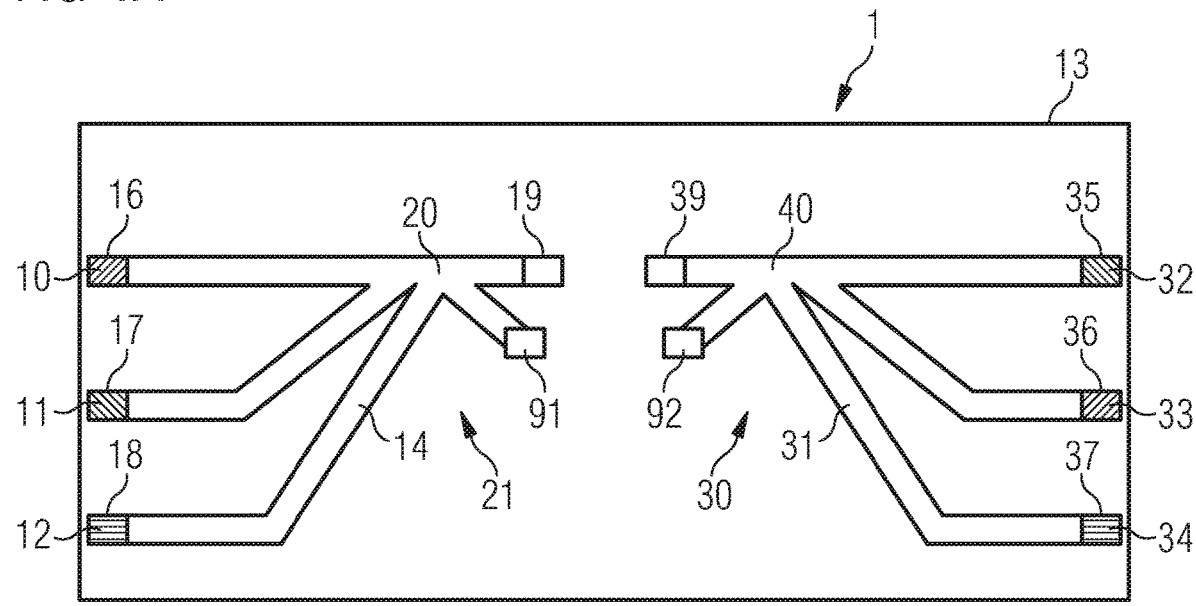
FIGS. 4A and 4B show exemplary embodiments of a planar light circuit with a photodiode.

FIG. 4A shows an exemplary embodiment of a planar light circuit 1 which is a further development of the embodiments shown above. The planar light circuit 1 comprises a photodiode 91 that is optically coupled to the first combiner 20, e.g. by a beam splitter. Thus, light emitted by the first number N of laser diodes 10 to 12 is guided to the first combiner 20 and is partially provided to the outlet 19 and partially to the photodiode 91. A material of the photodiode 91 is e.g. Si or Ge. Advantageously, the planar light circuit 1 includes an integrated photodiode for monitoring. Thus, the photodiode 91 is configured to detect the white point or a color of the first pixel 21. During reset of the MEMS mirror (dead time, scan back) the three colors e.g. can be sequentially monitored and calibrated. Alternatively, the photodiode 91 is realized as a segmented photodiode having color filters, in order to detect the three colors separately. Similarly, the second pixel 30 comprises a photodiode 92. Thus, only one photodiode per pixel is required.

Figure 4B:
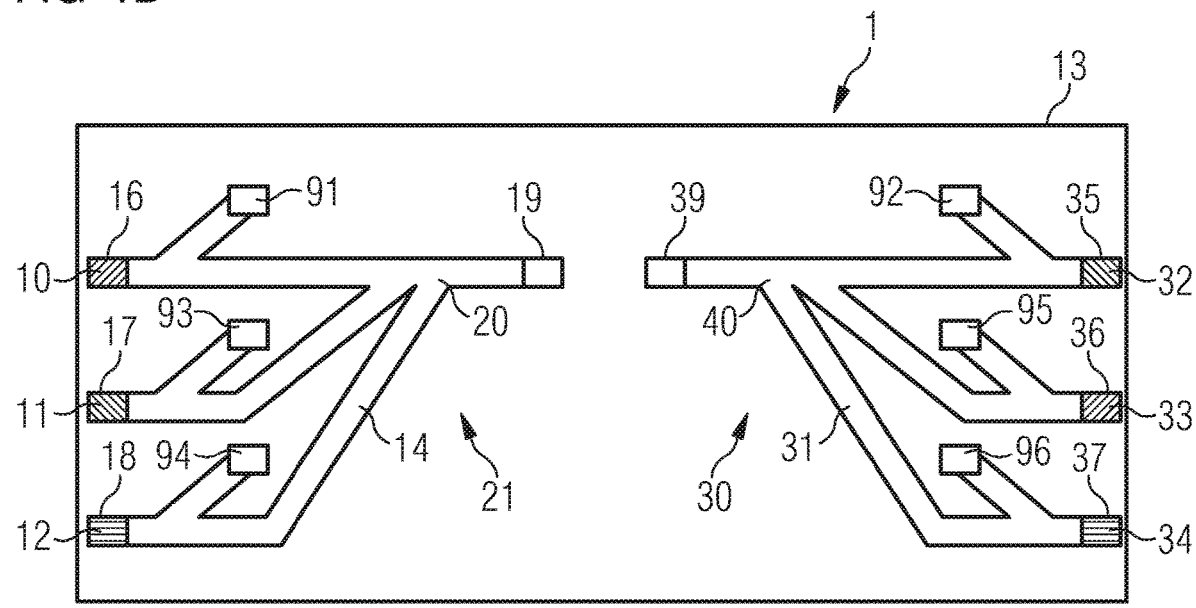

FIG. 4B shows an exemplary embodiment of a planar light circuit 1 which is a further development of the embodiments shown above. The first planar light circuit 1 comprises a first number N of photodiodes 91, 93, 94 which are coupled to the waveguide 14 between the first number N of inlets 16 to 18 and the first combiner 20. Thus, each of the first number N of laser diodes 10 to 12 is controlled by a photodiode 90, 93, 94. Similarly, the second pixel 30 comprises a second number N2 of laser diodes 91, 95, 96 which are optically connected to the second waveguide 31 between the second number N2 of inlets 35 to 37 and the second combiner 40. Thus, each of the laser diodes 10 to 12, 32 to 34 can be separately controlled.

Figure 5A:
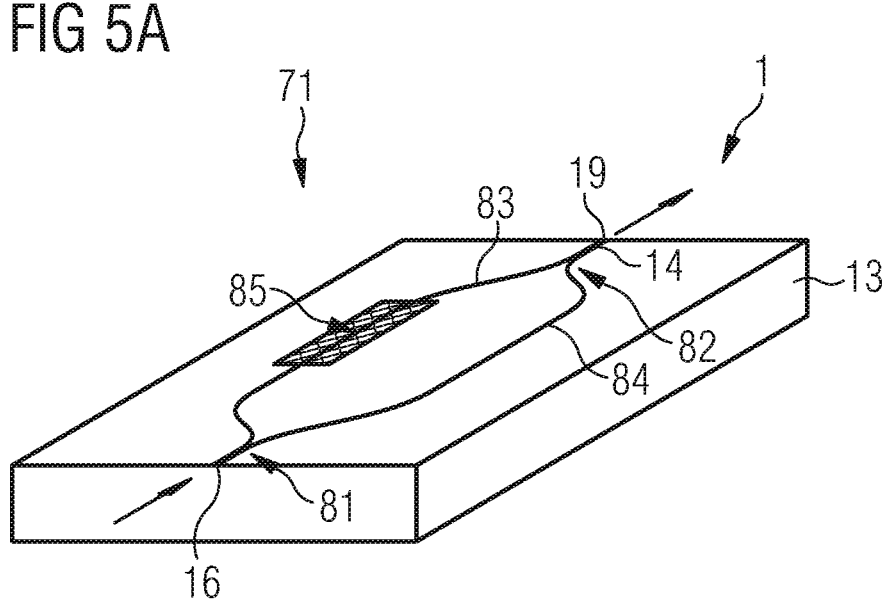

FIG. 5A shows an exemplary embodiment of a planar light circuit 1 with a Mach-Zehnder modulator 71 which is a further development of the embodiments shown above. The Mach-Zehnder modulator 71 or the Mach-Zehnder modulators 71 to 76 shown in FIGS. 3A and 3B can be realized such as the embodiments of the Mach-Zehnder modulator shown in FIGS. 5A to 5E. In the examples shown in FIGS. 5A to 5E, the planar light circuit 1 includes the first number N of laser diodes, wherein the first number N is 1.

The Mach-Zehnder modulator 71 is realized on the substrate 13. The Mach-Zehnder modulator 71 includes the beam splitter 81, the beam combiner 82, the first waveguide path 83 and the second waveguide path 84. The first waveguide path 83 couples the beam splitter 81 to the beam combiner 82. Correspondingly, the second waveguide path 84 couples the beam splitter 81 to the beam combiner 82. An arrow indicates the first inlet 16 that is an entrance to the beam splitter 81. A further arrow indicates the first outlet 19 that is an exit of the waveguide 14 at the beam combiner 82. The second waveguide path 84 includes an area 85 configured for realizing a wave front shift. In FIG. 5A, a schematic of a wavefront shift element for augmented reality/virtual reality data glasses is illustrated. The Mach-Zehnder modulator 71 is able to perform a destructive or a non-destructive modulation. The modulation changes the intensity and phase of the electromagnetic radiation provided to the Mach-Zehnder modulator 71. The Mach-Zehnder modulator is configured e.g. as a wavefront shift element.

Figure 5B:
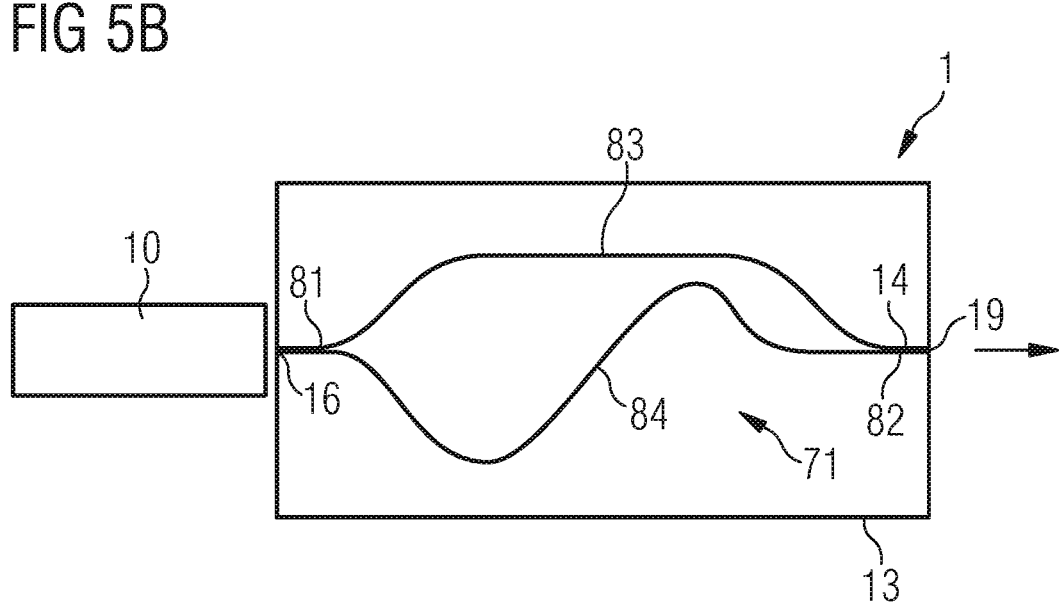

FIG. 5B shows a further exemplary embodiment of a planar light circuit 1 which is a further development of the embodiments shown above. The circuit 1 includes the Mach-Zehnder modulator 71 and the first laser diode 10 coupled via the first inlet 19 to the Mach-Zehnder modulator 71. A path length of the first waveguide path 83 is different from a path length of the second waveguide path 84. The Mach-Zehnder modulator 71 uses different path lengths.

Figure 5C:
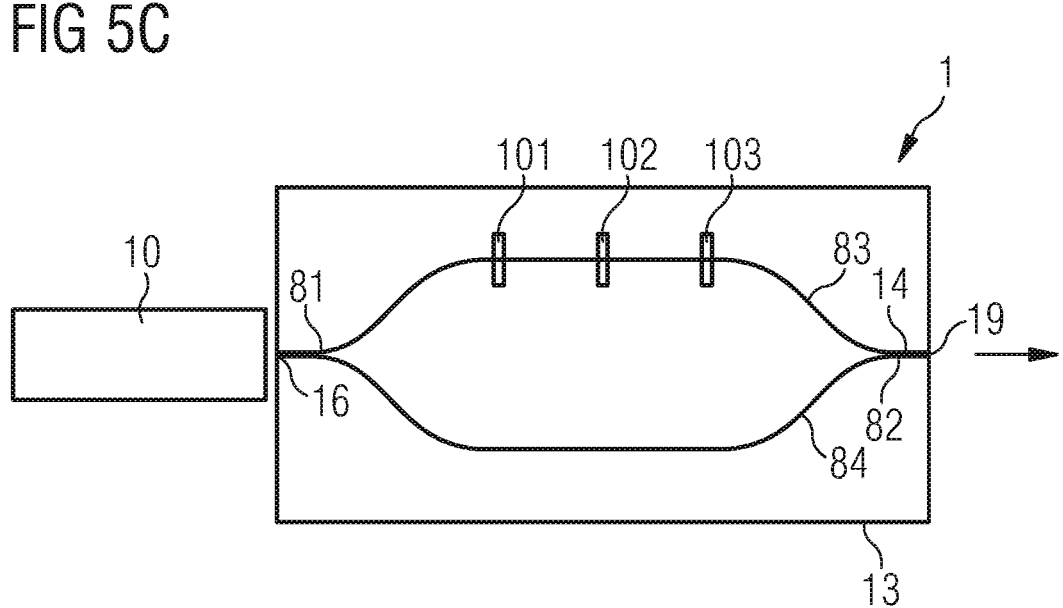

FIG. 5C shows an exemplary embodiment of a planar light circuit 1 which is a further development of the embodiments shown above. The second waveguide path 84 comprises a number P of sections 101 to 103. In the example shown in FIG. 5C, the number P is 3. Alternatively, the number P of sections 101 to 103 is 1, 2 or larger than 3. In an example, the number P of sections 101 to 103 are unfilled. The number P of sections 101 to 103 are realized as grooves. The sections 101 to 103 are unfilled with a solid material but filled with air. Each of the number P of sections 101 to 103 has two facets which are named e.g. an emitting facet and a receiving facet. The two facets are coated by an antireflective coating. Alternatively, the two facets are uncoated. The number P of sections 101 to 103 have a predetermined depths. E.g. the number P of sections 101 to 103 are free from a material of the waveguide 14. Thus, a depth of the number P of sections 101 to 103 is e.g. a thickness of the waveguide 14. Alternatively, the depth of the number P of sections 101 to 103 is larger than the thickness of the waveguide 14. Thus, the number P of sections 101 to 103 are partially inside the substrate 13. The Mach-Zehnder modulator 71 uses sections 101 to 103 and facets to customize light propagation.

In an alternative embodiment, the number P of sections 101 to 103 is filled with a material. The material has e.g. a higher or a lower refractive index in comparison to the material of the waveguide 14. The number P of sections 101 to 103 is partially or completely filled with the material. For example, the material is deposited using a physical deposition process such as sputtering or a chemical deposition process such as chemical vapor deposition.

In an alternative embodiment, the section comprises the material of the first waveguide 14 which is modified by a doping process. The doping process may include a deposition process of a layer on top of the waveguide material and a diffusion process of a dopant out of the deposited layer into the material of the waveguide.

Figure 5D:
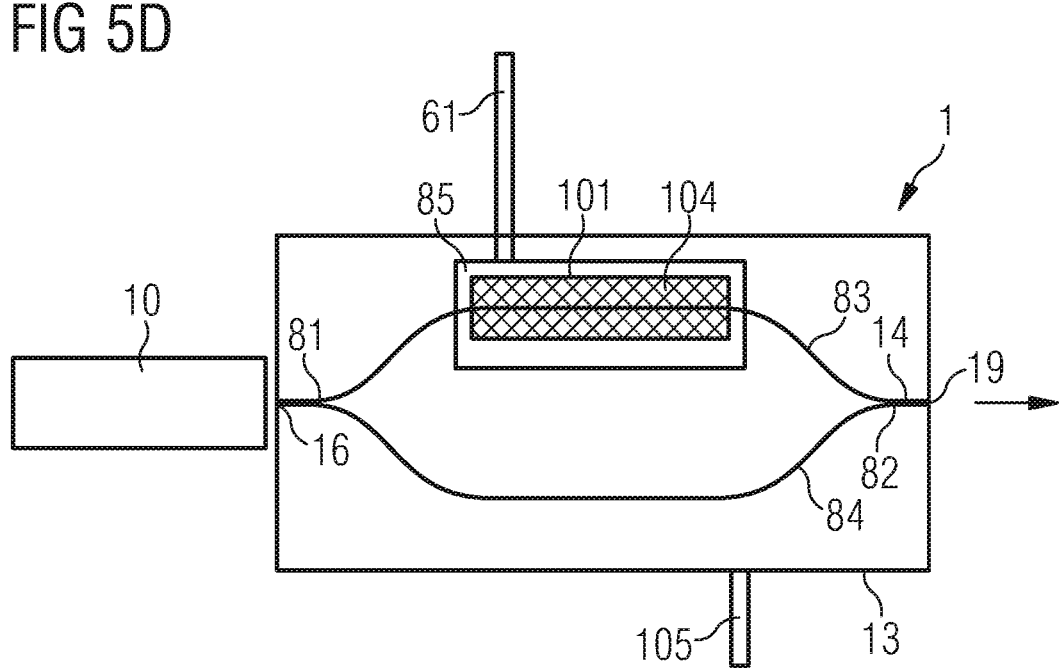

FIG. 5D shows another exemplary embodiment of a planar light circuit 1 which is a further development of the above-shown embodiments. In the area 85, a material of at least one of the waveguide 14 and/or of the substrate 13 is modified. For example, the first waveguide path 83 has the section 101. The section 101 is configured as a groove. The section 101 is at least partially filled with a material 104. The material 104 is e.g. an electro-optical material or a birefringent material (which can be named birefractive material). The material 104 is e.g. lithium niobate $LiNbO_3$. The Mach-Zehnder modulator 71 comprises the electrode 61. The electrode 61 is arranged on top of the material 104. A further electrode 105 is connected to the substrate 13. E.g. the substrate 13 is connected to a ground potential via the further electrode 105. Thus, a voltage provided between the electrode 61 and the substrate 13 generates an electric field in the material 104. The Mach-Zehnder modulator 71 is electrically controlled. The Mach-Zehnder modulator 71 uses a material 104 which is different from the material of the waveguide 14 to change a light propagation speed.

FIG. 5E shows a planar light circuit 1 which is a further development of the embodiments shown above. The planar light circuit 1 includes the Mach-Zehnder modulator 71. Moreover, the planar light circuit 1 includes the first laser diode 10. The first laser diode 10 is realized as an EEL. Thus, the circuit 1 is monolithically integrated with the number N of laser diodes 10 to 12. The first laser diode 10 comprises a front facet 107, a laser ridge 108 and a backside mirror 109. The backside mirror 109 is coupled via the laser ridge 108 to the front facet 107. The front facet 10 is configured as front side mirror. In an example, the front facet 107 is fabricated by a dry etch process and deposition of a dielectric layer or of dielectric layers after the dry etch process. In an example, the backside mirror 109 is fabricated by scratching and braking the substrate 13 and depositing a mirror film. In an alternative example, the backside mirror 109 is fabricated such as the front facet 107. Thus, in the example shown in FIG. 5E, the first laser diode 10 is implemented as a laser diode which is integrated in the substrate 13 and in the waveguide 14. The first laser diode 10 and the Mach-Zehnder modulator 71 are arranged on the same plane. In FIG. 5E, an integration of the wave-front shift element on die level is shown. The first laser diode 10 is realized as planar laser and/or an edge emitting laser. A material of the substrate 13 is e.g. GaN. In this example, the first laser diode 10 is not implemented as a VCSEL.

Figure 6A:
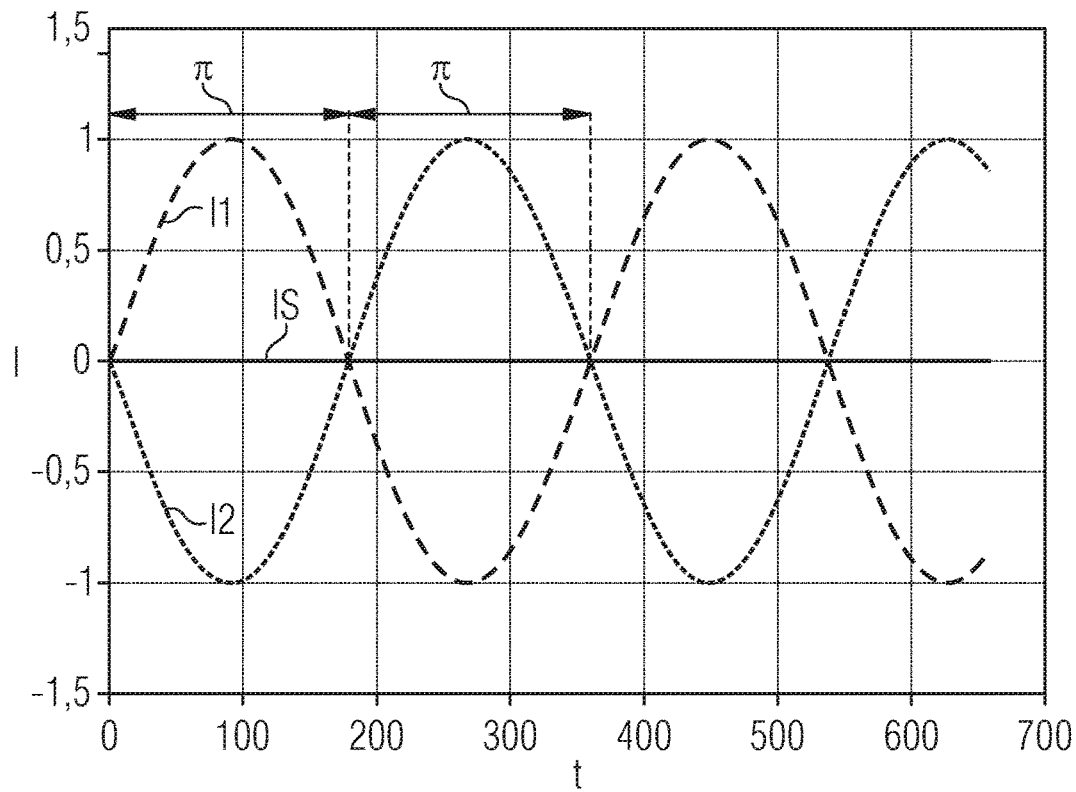
FIGS. 6A and 6B show exemplary characteristics of a planar light circuit.
Figure 6B:
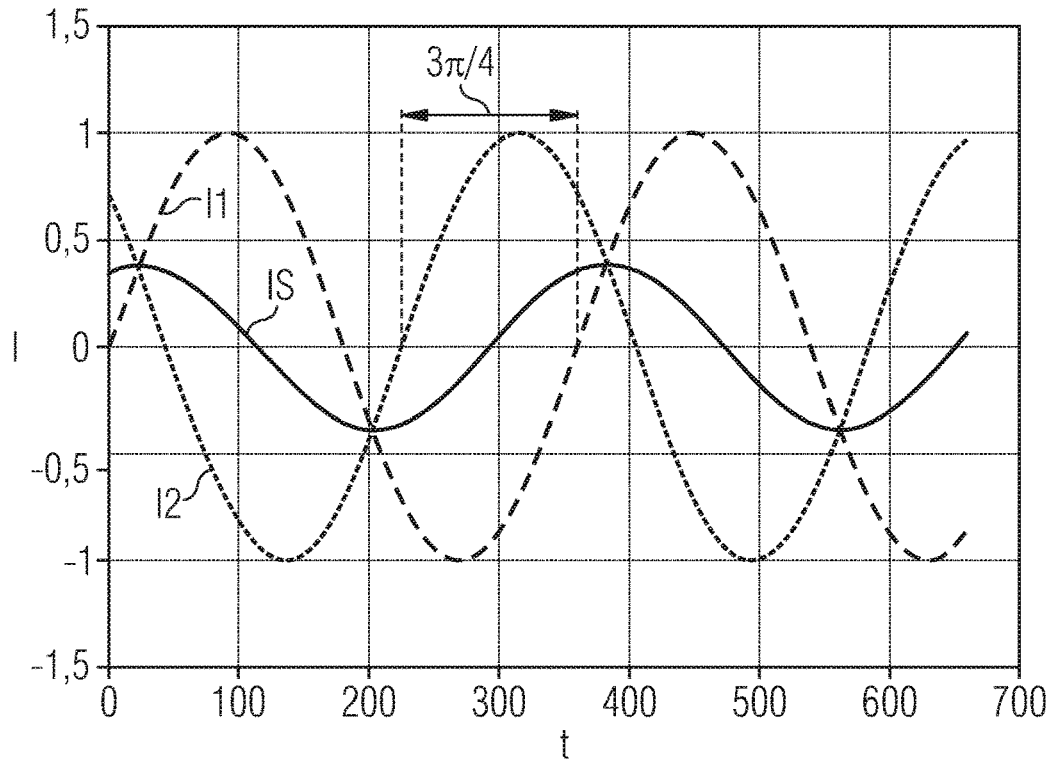

FIGS. 6A and 6B show characteristics of a planar light circuit 1 of one of the embodiments shown above, e.g. shown in FIGS. 5A to 5E. An intensity I (normalized to one) is shown as a function of time or period (artificial units). I1 is a first intensity at an end of the first waveguide path 83 and I2 is a second intensity at an end of the second waveguide path 84. IS is a resulting intensity at an outlet of the beam combiner 82. In FIG. 6A, a phase shift of 180 degrees between the first and the second intensity I1, I2 is achieved by the Mach-Zehnder modulator 71. Thus, the second intensity I2 obtains a wave front shift of 180 degree towards the first intensity I1. The resulting intensity IS is zero. Thus, FIG. 6A shows an example for destructive interference. Root cause for optical artefacts (fringes and speckle) is shown. In FIG. 6B, a phase shift of 135 degrees (¾ times 180 degree) between the first and the second intensity I1, I2 is achieved by the Mach-Zehnder modulator 71. In FIG. 6B, an example for homogenized intensity distribution by wave front shift is depicted.

A way to reduce disturbances is to broaden the spectral emission of the source (that means the first number N and the second number N2 of laser diodes). The circuit 1 is configured to shift the wave fronts from a single laser ridge emission relative to each other. By that the probability for destructive interference effects in-between light waves is reduced. In an example, a waveguide element (e.g. the modulator 71) is linked to the waveguide of the first laser diode 10. This linked waveguide element consists of three areas: A beam splitting area with the beam splitter 81, a beam propagation area and a beam combination area with the beam combiner 82. The beam propagation area consists of at least two waveguides (e.g. the first and the second waveguide path 83, 84) which have different light propagation properties.

The different light propagation properties of the Mach-Zehnder modulator 71 can be realized by:
Different shape, in the sense of different path length.
Different refractive index, in the sense of different propagation speed of the light in the waveguide.
The light guide might be interrupted by one or several sections 101 to 103 (e.g. realized as grooves) to generate areas along the light path with different propagation speed. The sections can remain unfilled (air) or can be filled with a low index material. The facets of the sections 102 to 103 can be coated with anti reflex coating to keep the losses low. Alternatively, the facets of the sections 101 to 103 also can be coated with any filter coating e.g. to tilt the polarization direction.

Optionally, features described above can be combined. In an example, the features above can be integrated on waver level in the laser die design. The circuit 1 has e.g. one or several of the following advantages: Suppression of optical artefacts generated by the interaction in-between coherent light sources (laser) and optical elements with periodic patterns (e.g.: diffractive waveguides) is achieved. The circuit 1 mainly uses passive elements. The circuit 1 is realized as compact element. Production of the circuit 1 is cost effective. The circuit 1 can easily be integrated into a data glasses architecture. The circuit 1 can be integrated or combined with beam shaping and beam combination. The circuit 1 could e.g. be integrated on wafer level in the laser die.

Figure 7A:
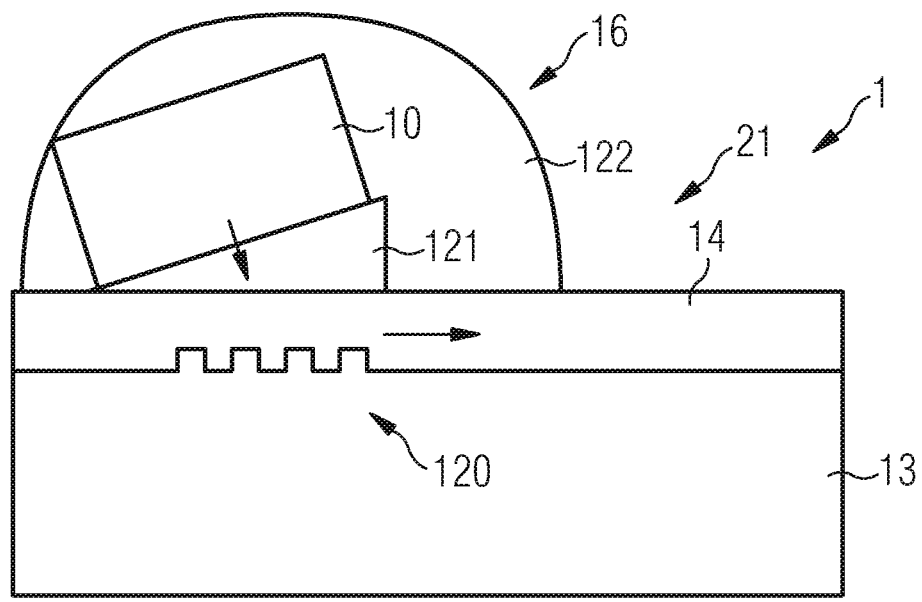
FIGS. 7A to 7C show exemplary embodiments of details of a planar light circuit and of an arrangement with a planar light circuit.

FIG. 7A shows an exemplary embodiment of details in a cross section of a planar light circuit 1 which is a further development of the embodiments shown above. The first inlet 16 includes a grating 120. The grating 120 is realized by ridges or stripes of the substrate 13. The ridges extend into the waveguide 14. The first inlet 16 comprises a prism 121. The prism 121 is attached to the waveguide 14. The prism 121 can have the same refractive index as the waveguide 14 or a different refractive index. The first laser diode 10, realized e.g. as a VCSEL is attached to the prism 121.

Optionally, the first inlet 16 comprises an encapsulation 122. The prism 121 and the grating 120 have the effect that the light propagates in the waveguide 14 in one direction. the layer forming the waveguide 14 is in contact with air and is not covered by a layer.

In an alternative, not shown embodiment, the circuit 1 includes a further layer covering the layer forming the waveguide 14. The further layer is e.g. an organic layer such as a photoresist.

Figure 7B:
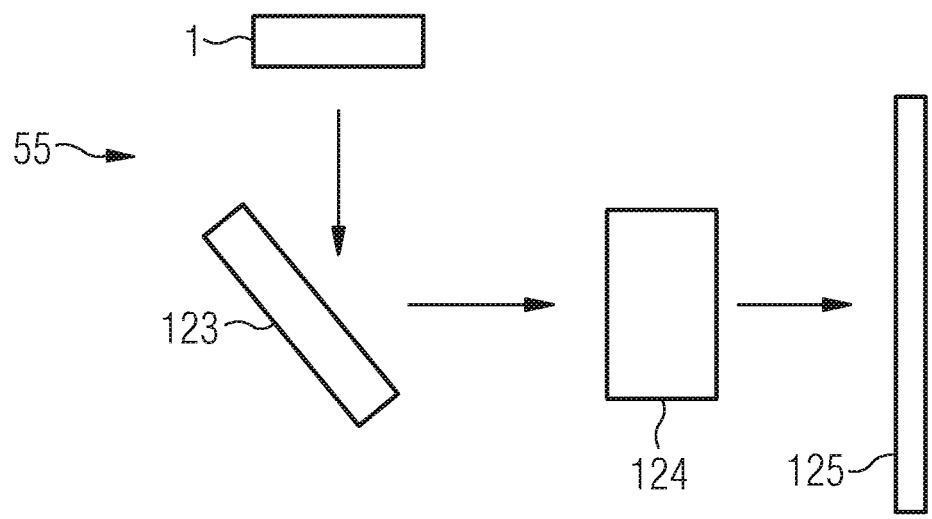

FIG. 7B shows an exemplary embodiment of an arrangement 55 with a planar light circuit 1 which is a further development of the embodiments shown above. The arrangement 55 comprises the planar light circuit 1, a MEMS mirror arrangement 123, an optical projection set-up 124 and glasses 125. In FIG. 7B, the arrangement 55 is only schematically illustrated. The planar light circuit 1 emits light which is mirrored by the MEMS mirror arrangement 123 and guided by the optical projection set-up 124 towards the glasses. The arrangement 55 is realized as data glasses 125. A head-up display, a laser beam scanning system, a near-to-eye display projector, smart glasses, augmented reality glasses and virtual reality glasses operate similar or identical to the arrangement 55 shown in FIG. 7B.

The planar light circuit 1 realizes an array of outlets, such as shown in FIGS. 2B and 2C. For example, the number L of outlets are located in two rows each having a number L/2 outlets. The planar light circuit 1 implements an emitter array. The outlets are e.g. located on a rectangle having the distance DI and the pitch PI as side lengths. The planar light circuit 1 is configured for beam shaping and beam combining.

In an example, the pitch PI is the distance in the scan direction of a fast mirror (line scan) of a LBS system. For example, the pitch PI is in a range between 3 µm and 1000 µm or between 4 µm and 500 µm or between 4 µm and 12 µm, depending on the optical system. The specification refers to the distance of the respective outer emission points in the array.

In the scan direction of a slow mirror (line to line index), the distance DI has smaller value in comparison to the pitch PI. For example, the distance DI is in a range between 1 µm and 60 µm or between 2 µm and 50 µm or between 2 µm and 5 µm depending on the optical system. The MEMS mirror arrangement 123 includes e.g. the fast and the slow mirror. In an example, flickering is reduced or suppressed by a higher frame rate, either by increasing the mirror frequency or by writing several pixels within one oscillation cycle of the mirror.

Figure 7C:
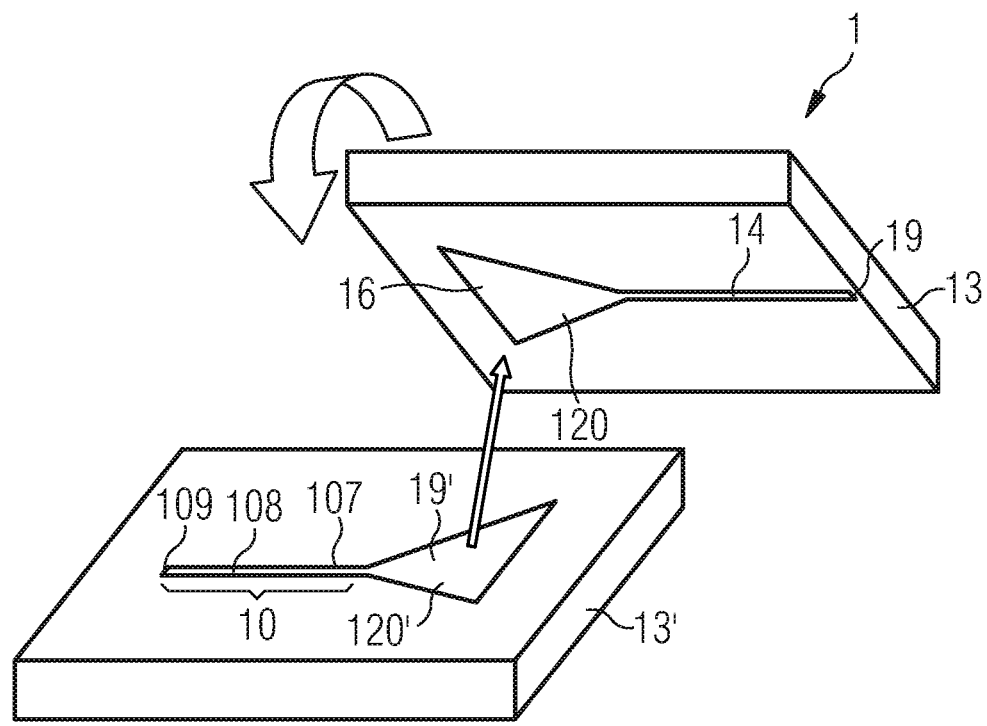
Figure 7C:
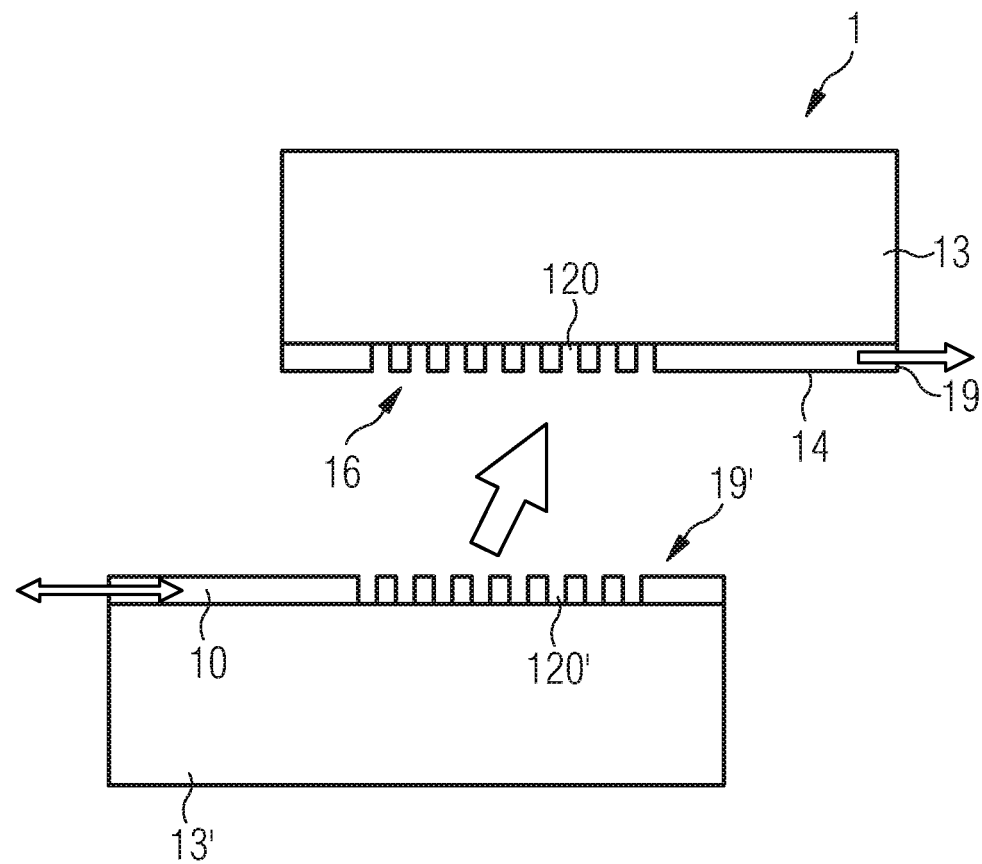

FIG. 7C shows an exemplary embodiment of details in a three-dimensional view and in a cross section of a planar light circuit 1 which is a further development of the embodiments shown above. The first laser diode 10 is realized on a further substrate 13' of the planar light circuit 1. The first laser diode 10 is coupled via a further outlet 19' to the inlet 16. The inlet 16 of the first pixel 21 includes the grating 120. The outlet 19' of the first laser diode 10 includes a further grating 120'. Thus, the first laser diode 10 and the waveguide 14 are coupled to each other by a grating coupling. The first laser diode 10 is implemented as an EEL. The first laser diode 10 has the front facet 107, the laser ridge 108 and the backside mirror 109, as shown e.g. in FIG. 5E. The first laser diode 10 emits not at an edge of the further substrate 13' but with an angle with respect to a first main surface of the further substrate 13'. A wavelength of the first laser diode 10 is determined by the distance between the front facet 107 and the backside mirror 109. Since the first laser diode 10 operates such as the laser diode 10 shown in FIG. 5E and emits at the edge of the front facet 107, the first laser diode 10 can be named EEL.

The invention is not limited to the description of the embodiments. Rather, the invention comprises each new feature as well as each combination of features, particularly each combination of features of the claims, even if the feature or the combination of features itself is not explicitly given in the claims or embodiments.

LIST OF REFERENCE SIGNS 1 planar light circuit
10 first laser diode
11 second laser diode
12 third laser diode
13, 13' substrate
14 waveguide
16 to 18 inlet
19, 19' first outlet
20 first combiner
21 first pixel
30 second pixel
31 second waveguide
32 to 34 laser diode
35 to 37 inlet
39 second outlet
40 second combiner
45 to 48 pixel
49 to 52 outlet
53, 54 row
55 arrangement
56 stack
57 further planar light circuit
61 to 66 electrodes
71 to 76 Mach-Zehnder modulator
81 beam splitter
82 beam combiner
83, 84 waveguide path
85 area
91 to 96 photodiode
101 to 103 section
104 material
105 further electrode
107 front facet
108 laser ridge
109 backside mirror
120 grating
121 prism
122 encapsulation
123 MEMS mirror arrangement
124 optical projection set-up
125 glasses
DI distance
I, I1, I2, IS intensity
PI pitch

The invention claimed is:

1. A planar light circuit, comprising:
a substrate; and
a first pixel and a second pixel,
wherein the first pixel comprises:
a first number N of laser diodes,
a first waveguide located on the substrate,
a first number N of inlets which couple the first number N of laser diodes to the first waveguide and
a first outlet,
wherein the first waveguide couples the first number N of inlets to the first outlet,
wherein the second pixel comprises:
a second number N2 of laser diodes,
a second waveguide located on the substrate,
a second number N2 of inlets which couple the second number N2 of laser diodes to the second waveguide, and
a second outlet,
wherein the second waveguide couples the second number N2 of inlets to the second outlet,
wherein the second outlet of the second pixel is adjacent to the first outlet of the first pixel,
wherein a distance of the first outlet to the second outlet is in a range between 1 µm and 60 µm, and
wherein the distance is determined between a center of the first outlet and a center of the second outlet.

2. The planar light circuit of claim 1,
wherein the first waveguide includes a Mach-Zehnder modulator comprising
a beam splitter,
a beam combiner,
a first waveguide path coupling the beam splitter to the beam combiner and a second waveguide path coupling the beam splitter to the beam combiner, wherein the first waveguide path and the second waveguide path are configured to have different light propagation properties.

3. The planar light circuit of claim 2, wherein a path length of the first waveguide path is different from a path length of the second waveguide path and/or at least one of the first and the second waveguide path comprises a number P of sections, wherein a section of the number P of sections which comprises at least one of air, a material with low refractive index and a modified material of the first waveguide.

4. The planar light circuit of claim 2, wherein at least one of the first waveguide path and the second waveguide path includes a section filled with an electro-optical material, and wherein the Mach-Zehnder modulator includes an electrode coupled to the electro-optical material.

5. The planar light circuit of claim 1, wherein a laser diode of the first number N of laser diodes comprises a front facet, a laser ridge and a backside mirror, wherein the front facet, the laser ridge and the backside mirror are realized at or on the substrate, and wherein the front facet is coupled to an inlet of the first number N of inlets.

6. The planar light circuit of claim 1, wherein an inlet of the first number N of inlets comprises at least one of a prism, a grating and an encapsulation.

7. The planar light circuit of claim 1, wherein the first outlet is configured for top emission of light.

8. The planar light circuit of claim 1, wherein the planar light circuit comprises a second pixel, wherein the second pixel comprises a second number N2 of laser diodes, a second waveguide located on the substrate, a second number N2 of inlets which couple the second number N2 of laser diodes to the second waveguide and a second outlet, wherein the second waveguide couples the second number N2 of inlets to the second outlet, and wherein the second outlet of the second pixel is adjacent to the first outlet of the first pixel.

9. The planar light circuit of claim 8, wherein the first number N is at least 3 and the second number N2 is at least 3, and wherein the first number N of laser diodes and the second number N2 of laser diodes are realized as at least one of vertical-cavity surface-emitting lasers—VCSELs—and edge emitting lasers—EELs.

10. The planar light circuit of claim 9, wherein the first number N of laser diodes include a red laser diode, a green laser diode and a blue laser diode, and wherein the second number N2 of laser diodes include a red laser diode, a green laser diode and a blue laser diode.

11. The planar light circuit of claim 8, wherein a first laser diode of the first number N of laser diodes is configured to emit electromagnetic radiation at a first wavelength, wherein a further first laser diode of the second number N2 of laser diodes is configured to emit electromagnetic radiation at a further first wavelength, and wherein a first difference of the first wavelength and of the further first wavelength is in a range between 3 nm and 15 nm.

12. The planar light circuit of claim 8, wherein at least one of the first waveguide and the second waveguide comprises a Mach-Zehnder modulator.

13. The planar light circuit of claim 8, wherein the planar light circuit comprises a number L of pixels which include the first and the second pixel, wherein the number L is at least four, wherein outlets of the number L of pixels are arranged in an array form.

14. An arrangement, comprising the planar light circuit of claim 1, wherein the arrangement is realized as data glasses.

15. A planar light circuit, comprising:

a substrate;

a photodiode; and a first pixel, wherein the first pixel comprises:

a first number N of laser diodes, a first waveguide located on the substrate and comprising a first combiner and a beam splitter, a first number N of inlets which couple the first number N of laser diodes to the first waveguide and a first outlet, wherein the first waveguide couples the first number N of inlets to the first outlet, wherein a first laser diode of the first number N of laser diodes is implemented as a laser diode which is integrated in the substrate, wherein the first combiner is coupled on its input side to the first number of inlets and on its output side to the first outlet, and wherein the photodiode is optically coupled to the first combiner by the beam splitter.

16. A planar light circuit, comprising a substrate;

a further substrate; and a first pixel, wherein the first pixel comprises:

a first number N of laser diodes, a first waveguide located on the substrate, a first number N of inlets which are located on the substrate and couple the first number N of laser diodes to the first waveguide and a first outlet, wherein the first waveguide couples the first number N of inlets to the first outlet, wherein a first laser diode of the first number N of laser diodes is realized on the further substrate, wherein the first laser diode is coupled via a further outlet of the further substrate to a first inlet of the first number N of inlets, wherein the first inlet comprises a grating, and wherein the further outlet comprises a further grating.

* * * * *

UNITED STATES PATENT AND TRADEMARK OFFICE
CERTIFICATE OF CORRECTION

PATENT NO. : 11,825,244 B2
APPLICATION NO. : 17/234311
DATED : November 21, 2023
INVENTOR(S) : Jörg Erich Sorg et al.

It is certified that error appears in the above-identified patent and that said Letters Patent is hereby corrected as shown below:

In the Claims

Claims should read:

1. A planar light circuit, comprising:
- a substrate; and
- a first pixel and a second pixel.
wherein the first pixel comprises:
- a first number N of laser diodes,
- a first waveguide located on the substrate,
- a first number N of inlets which couple the first number N of laser diodes to the first waveguide and
- a first outlet,
wherein the first waveguide couples the first number N of inlets to the first outlet,
wherein the second pixel comprises:
a second number N2 of laser diodes,
a second waveguide located on the substrate,
a second number N2 of inlets which couple the second number N2 of laser diodes to the second waveguide,
and
a second outlet,
wherein the second waveguide couples the second number N2 of inlets to the second outlet,
wherein the second outlet of the second pixel is adjacent to the first outlet of the first pixel,
wherein a distance of the first outlet to the second outlet is in a range between 1 µm and 60 µm, and
wherein the distance is determined between a center of the first outlet and a center of the second outlet.

2. The planar light circuit of claim 1,
wherein the first waveguide includes a Mach-Zehnder modulator comprising
- a beam splitter,
- a beam combiner, Signed and Sealed this
Twenty-fourth Day of December, 2024

Derrick Brent
*Acting Director of the United States Patent and Trademark Office*

- a first waveguide path coupling the beam splitter to the beam combiner and
- a second waveguide path coupling the beam splitter to the bear combiner,
wherein the first waveguide path and the second waveguide path are configured to have different light propagation properties.

3. The planar light circuit of claim 2,
wherein a path length of the first waveguide path is different from a path length of the second waveguide path and/or
at least one of the first and the second waveguide path comprises a number P of sections, wherein a section of the number P of sections comprises at least one of air, a material with low refractive index and a modified material of the first waveguide.

4. The planar light circuit of claim 2,
wherein at least one of the first waveguide path and the second waveguide path includes a section filled with an electro-optical material, and
wherein the Mach-Zehnder modulator includes an electrode coupled to the electro-optical material.

5. The planar light circuit of claim 1,
wherein a laser diode of the first number N of laser diodes comprises a front facet, a laser ridge and a backside mirror,
wherein the front facet, the laser ridge and the backside mirror are realized at or on the substrate, and
wherein the front facet is coupled to an inlet of the first number N of inlets.

6. The planar light circuit of claim 1,
wherein an inlet of the first number N of inlets comprises at least one of a prism, a grating and an encapsulation.

7. The planar light circuit of claim 1,
wherein the first outlet is configured for top emission of light.

8. The planar light circuit of claim 1,
wherein the first number N is at least 3 and the second number N2 is at least 3, and
wherein the first number N of laser diodes and the second number N2 of laser diodes are realized as at least one of vertical-cavity surface-emitting lasers – VCSELs – and edge emitting lasers – EELs -.

9. The planar light circuit of claim 1,
wherein the first number N of laser diodes include a red laser diode, a green laser diode and a blue laser diode, and
wherein the second number N2 of laser diodes include a red laser diode, a green laser diode and a blue laser diode.

10. The planar light circuit of claim 1,
wherein a first laser diode of the first number N of laser diodes is configured to emit electromagnetic radiation at a first wavelength,
wherein a further first laser diode of the second number N2 of laser diodes is configured to emit electromagnetic radiation at a further first wavelength, and wherein a first difference of the first wavelength and of the further first wavelength is in a range between 3 nm and 15 nm.

11. The planar light circuit of claim 1,
wherein at least one of the first waveguide and the second waveguide comprises a Mach-Zehnder modulator.

12. The planar light circuit of claim 1,
wherein the planar light circuit comprises a number L of pixels which include the first and the second pixel,
wherein the number L is at least four,
wherein outlets of the number L of pixels are arranged in an array form.

13. An arrangement, comprising the planar light circuit of claim 1,
wherein the arrangement is realized as data glasses.

14. A planar light circuit, comprising:
a substrate;
a photodiode; and
a first pixel,
wherein the first pixel comprises:
a first number N of laser diodes,
a first waveguide located on the substrate and comprising a first combiner and a beam splitter,
a first number N of inlets which couple the first number N of laser diodes to the first waveguide and
a first outlet,
wherein the first waveguide couples the first number N of inlets to the first outlet,
wherein a first laser diode of the first number N of laser diodes is implemented as a laser diode which is integrated in the substrate,
wherein the first combiner is coupled on its input side to the first number of inlets and on its output side to the first outlet, and
wherein the photodiode is optically coupled to the first combiner by the beam splitter.

15. A planar light circuit, comprising
a substrate;
a further substrate; and
a first pixel,
wherein the first pixel comprises:
a first number N of laser diodes,
a first waveguide located on the substrate,
a first number N of inlets which are located on the substrate and couple the first number N of laser diodes to the first waveguide and
a first outlet,
wherein the first waveguide couples the first number N of inlets to the first outlet,
wherein a first laser diode of the first number N of laser diodes is realized on the further substrate,
wherein the first laser diode is coupled via a further outlet of the further substrate to a first inlet of the first number N of inlets, wherein the first inlet comprises a grating, and
wherein the further outlet comprises a further grating.